(12) United States Patent
Gomez Diaz et al.

(10) Patent No.: US 10,762,878 B1
(45) Date of Patent: Sep. 1, 2020

(54) SYSTEM FOR GUIDING A USER THROUGH AN IMMERSIVE EXPERIENCE

(71) Applicant: Disney Enterprises, Inc., Burbank, CA (US)

(72) Inventors: Jose Luis Gomez Diaz, Los Angeles, CA (US); Jeffrey Gipson, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/536,840

(22) Filed: Aug. 9, 2019

(51) Int. Cl.
*G09G 5/37* (2006.01)
*G06F 3/01* (2006.01)

(52) U.S. Cl.
CPC ............... *G09G 5/37* (2013.01); *G06F 3/012* (2013.01); *G06F 3/013* (2013.01); *G09G 2354/00* (2013.01)

(58) Field of Classification Search
CPC ..... G06F 3/013; G06F 3/012; G09G 2354/00; G09G 5/37
See application file for complete search history.

(56) References Cited

U.S. PATENT DOCUMENTS

| 10,127,632 | B1 * | 11/2018 | Burke | G06T 3/4038 |
| 2018/0093177 | A1 * | 4/2018 | Tokubo | A63F 13/53 |
| 2020/0014903 | A1 * | 1/2020 | Phillips | H04N 13/161 |

OTHER PUBLICATIONS

Gipson, Jeff, et al., "VR Story Production on Disney Animation's Cycles," SIGGRAPH '18 Talks, Aug. 12-16, 2018, Vancouver, BC, Canada.
Anonymous, "Cycles A Disney VP Experience," 3D Artist, issue No. 132, Apr. 29, 2019, https://issuu.com/futurepublishing/docs/tda132.issuu.

* cited by examiner

*Primary Examiner* — Muhammad N Edun
(74) *Attorney, Agent, or Firm* — Esplin & Associates, PC

(57) ABSTRACT

An immersive experience system has a display device and a processor. The processor receives media content including one or more normal video frames. Further, the processor tracks an orientation of the display device with respect to an intended focal point within an immersive experience. Moreover, the processor determines whether the orientation of the display device exceeds an angular displacement threshold. In response to a determination that the orientation of the display device does not exceed the angular displacement threshold, the processor renders a normal video frame from the received media content on a display device. Conversely, in response to a determination that the orientation of the display device exceeds the angular displacement threshold, the processor modifies one or more properties of the normal video frame to generate a modified video frame.

20 Claims, 16 Drawing Sheets

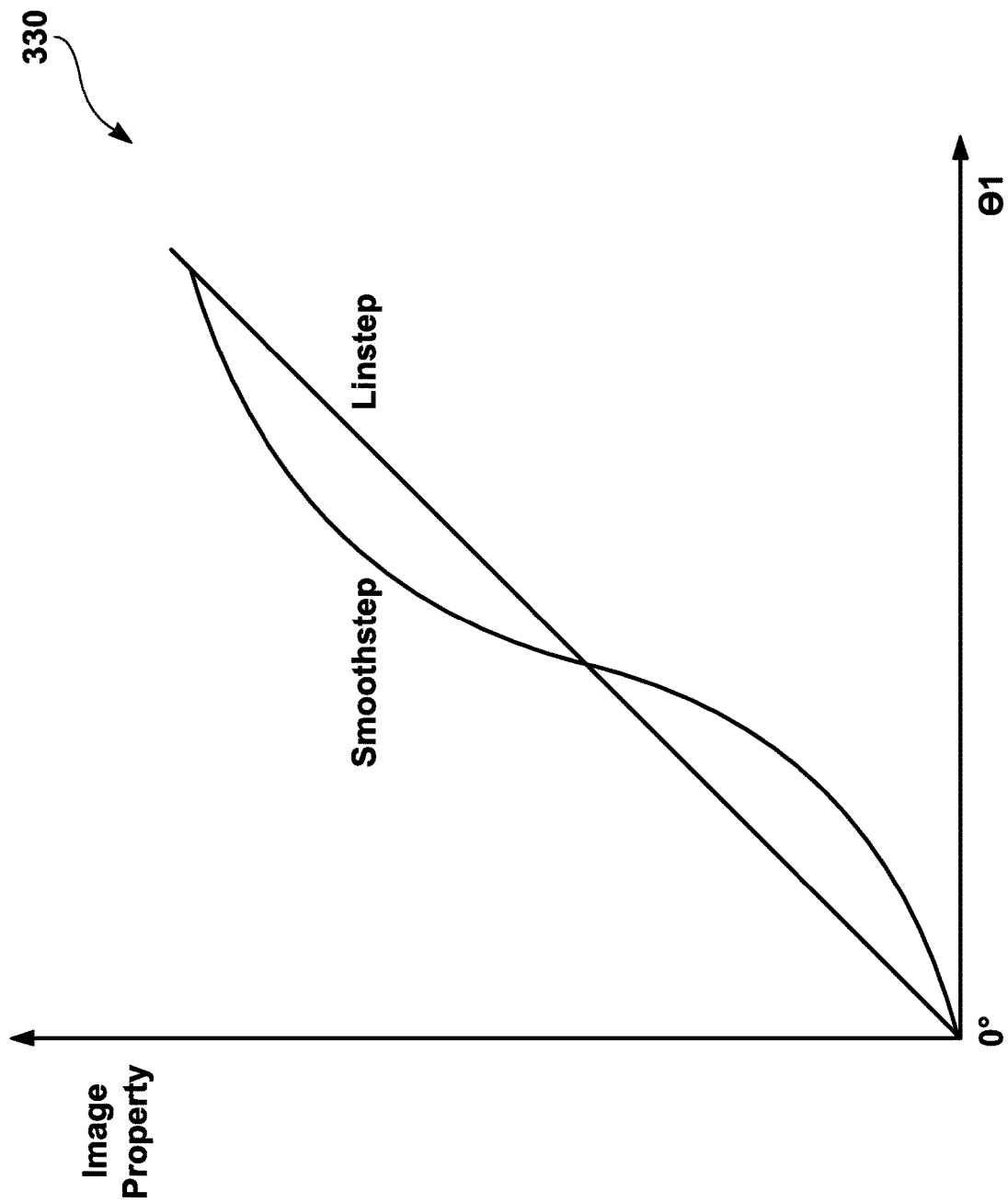

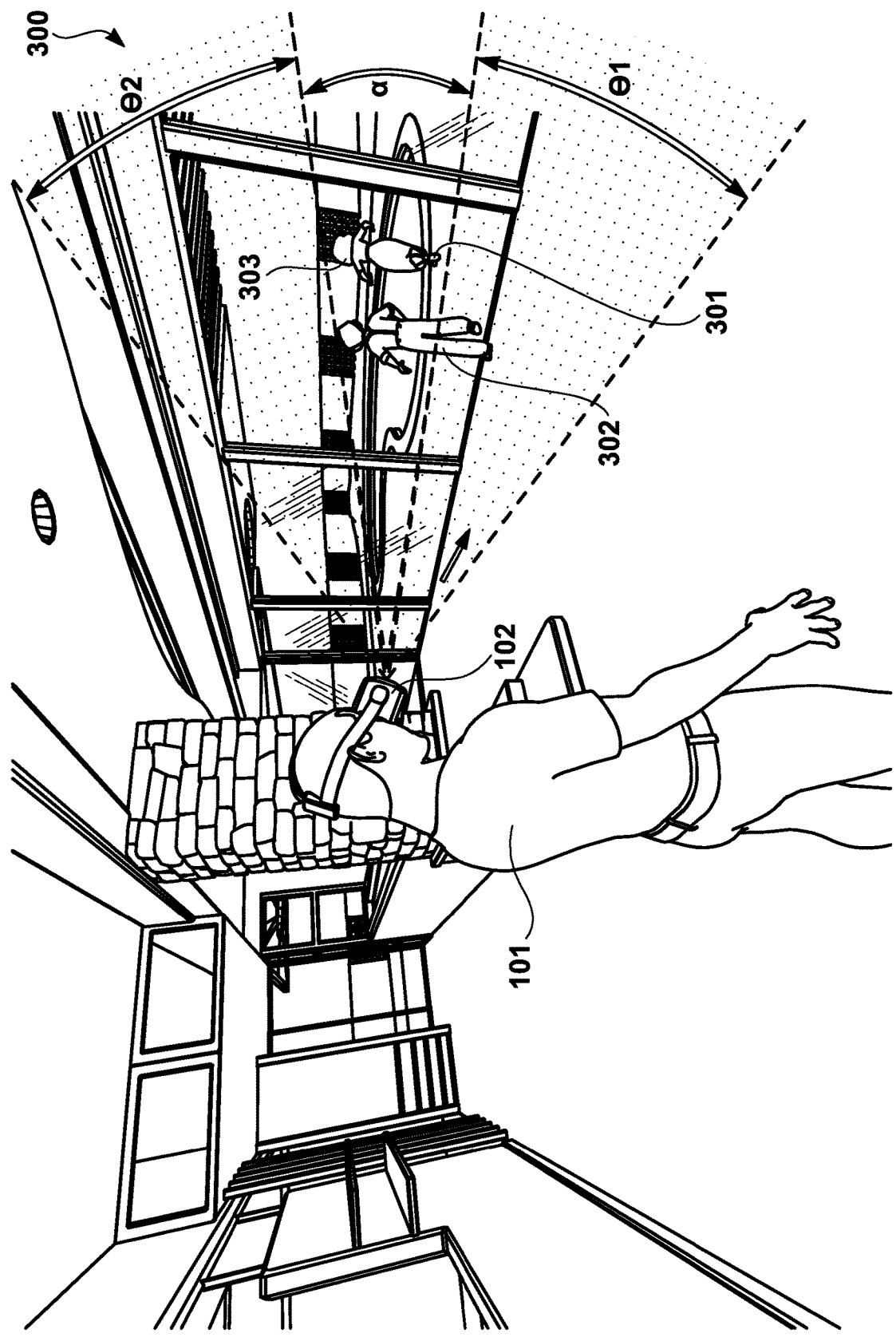

SYSTEM FOR GUIDING A USER THROUGH AN IMMERSIVE EXPERIENCE

BACKGROUND

1. Field

This disclosure generally relates to the field of audio/visual ("AN") equipment. More particularly, the disclosure relates to an A/V system that provides an immersive experience.

2. General Background

Virtual reality ("VR") and augmented reality ("AR") are the two most common immersive experience technologies. Whereas a VR apparatus typically provides an immersive experience that is completely virtual, an AR apparatus typically provides a virtual experience in conjunction with a real-world experience, often referred to as a mixed reality ("MR") experience (e.g., a virtual overlay of various text and/or images over a real-world object, person, place, etc.). A head-mounted display ("HMD") device is often worn on the head of a user participating in a VR experience, and sometimes in an AR experience.

In contrast with a prerecorded media experience, which typically includes a series of scenes captured and/or generated from a particular viewpoint determined by a director, an immersive experience provides a user with the freedom to choose his or her own viewpoint within an immersive experience environment. Yet, an immersive experience also poses directorial challenges when the immersive experience is intended to tell a story. For example, a director may want the user to view certain people and/or objects within the immersive experience environment in a particular sequence, but the user has the latitude to look anywhere in the immersive experience environment. In other words, for a given scene, the user may not look in the direction intended by the director of the immersive experience.

Conventional configurations use a variety of disruptive techniques (e.g., flashing arrows, moving fireflies, etc.) to direct the user's attention, but such techniques often interfere with the user's enjoyment of the immersive experience. As a result, the user often feels as if his or her movement is restricted. Therefore, conventional systems do not adequately guide a user's attention during the user's participation in an immersive experience.

SUMMARY

In one aspect, an immersive experience system is provided. The immersive experience system has a display device and a processor. The processor receives media content including one or more normal video frames. Further, the processor tracks an orientation of the display device with respect to an intended focal point within an immersive experience. Moreover, the processor determines whether the orientation of the display device exceeds an angular displacement threshold. In response to a determination that the orientation of the display device does not exceed the angular displacement threshold, the processor renders a normal video frame from the received media content on a display device. Conversely, in response to a determination that the orientation of the display device exceeds the angular displacement threshold, the processor modifies one or more properties of the normal video frame to generate a modified video frame.

In another aspect, a process is provided to perform the functionality of the system. In yet another aspect, a non-transitory computer readable storage device has a computer readable program stored thereon that executes the process.

BRIEF DESCRIPTION OF THE DRAWINGS

The above-mentioned features of the present disclosure will become more apparent with reference to the following description taken in conjunction with the accompanying drawings, wherein like reference numerals denote like elements and in which:

FIG. 3F illustrates an interpolation graph, which illustrates a smoothing function that is applied to an image property as an angular displacement from the intended focal point increases up to the interpolated angular displacement threshold.

FIG. 3J illustrates the VR device processor detecting head movement in the up and down directions, and whether such movement is within the angular displacement threshold and/or the interpolated angular displacement threshold.

DETAILED DESCRIPTION

A system is provided for guiding a user operating an immersive experience device (e.g., HMD, Ark. glasses, smartphone, smartwatch, etc.) through an immersive experience rendered based on received VR media content. In particular, the system may modify one or more image properties, one or more audio properties, or a combination of one or more image properties and one or more audio properties of the received VR media content within an immersive experience environment to seamlessly direct the focus of the user toward an intended focal point or an area in proximity thereto within the immersive experience environment. The intended focal point may be a particular feature of a person, place, or object within the immersive experience (e.g., the eyes of a virtual character, a center of a room, a table in a dining room, etc.). Upon determining whether an immersive experience device (e.g., HMD) is oriented within or outside of an angular displacement threshold with respect to the intended focal point, the system modifies one or more properties (e.g., visual and/or audio) of a frame when the user's current focal point (as determined, for example, by an orientation of the immersive experience device) is outside of the angular displacement threshold. By performing such modification, the system guides the user to adjust his or her perspective away from the current focal point, back to the intended focal point.

In contrast with conventional approaches, in one embodiment, the system may guide a user without the insertion of additional imagery that may interrupt the user's enjoyment of the immersive experience. In particular, in examples in which the modification includes a modification of one or more image properties, no additional pixels (e.g., flashing arrows, moving fireflies, etc.) are being added to the VR media content. Instead, the properties of the existing pixels of the VR media content are being modified.

Figure 1:
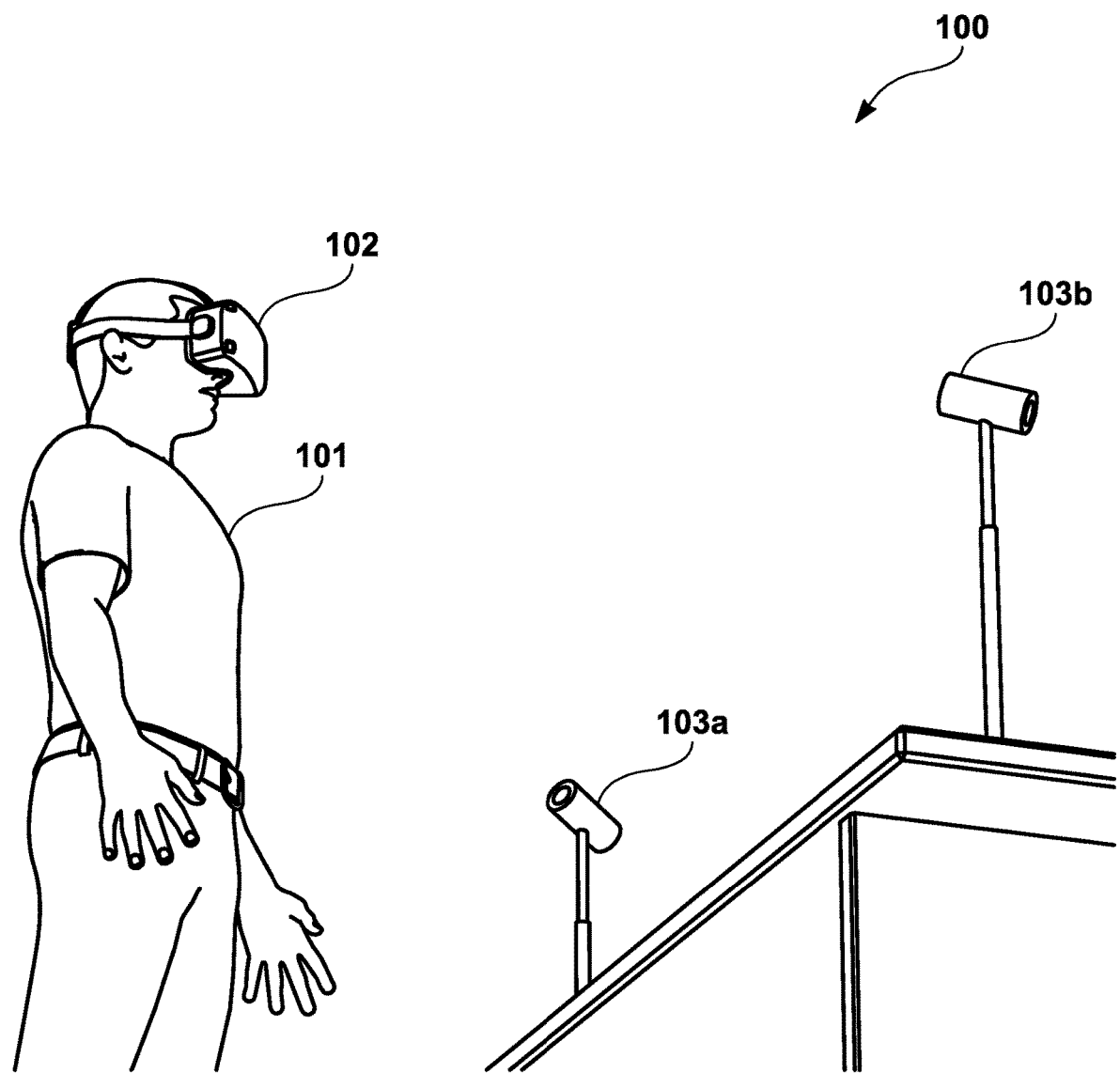
FIG. 1 illustrates an example of an immersive experience environment being a VR environment.

FIG. 1 illustrates an example of an immersive experience environment being a VR environment 100. A user may 101 may be positioned within a real-world environment, while operating an immersive experience device, such as a VR HMD 102. Other types of VR devices other than an HMD may be used; the VR HMD 102 is illustrated only as one example of a VR device that may be used within a VR environment. Various devices external to, and/or integrated within, the VR HMD 102 may be used to track the position of the VR HMD 102. For example, a plurality of image capture devices 103a and 103b (e.g., cameras) may be used to capture real-world imagery of the position and/or orientation of the VR HMD 102. The plurality of image capture devices 103a and 103b may transmit such positions (via wireless or wired connections) to a processor integrated within, or external to, the VR HMD 102. The processor may then map the real world movements and/or orientation of the VR HMD 102 to the virtual world rendered by a display device integrated within, or external to, the VR HMD 102. The plurality of image capture devices 103a and 103b are illustrated only for example purposes since other types of tracking methodologies, which may or may not use image capture, may be used instead.

Figure 2:
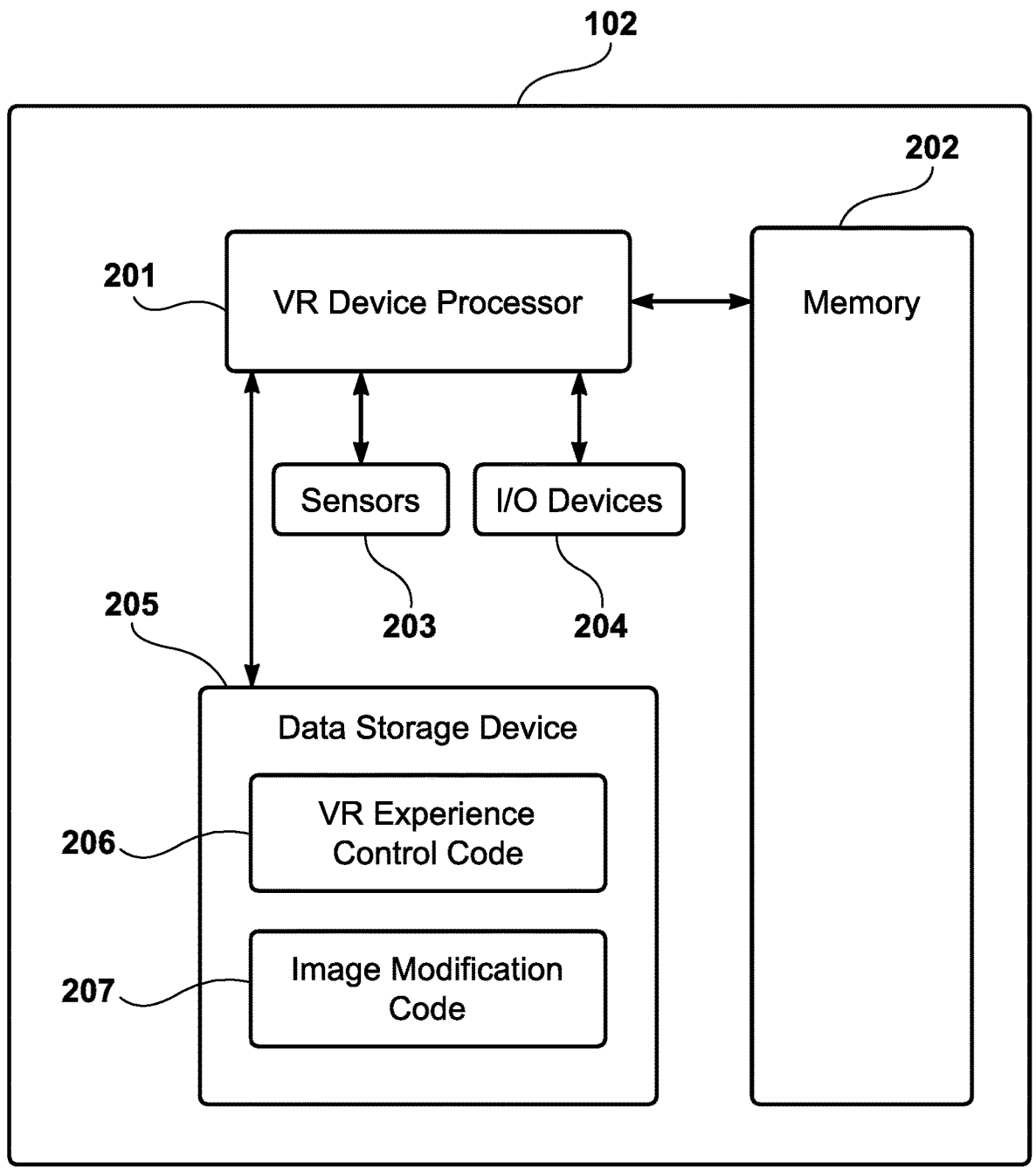
FIG. 2 illustrates a system configuration for the VR HMD illustrated in FIG. 1.

FIG. 2 illustrates a system configuration for the VR HMD 102 illustrated in FIG. 1. The internal components of the VR HMD 102 include a VR device processor 201, which may be specialized/programmed for generating a VR experience. For example, the VR device processor 201 may be programmed to render VR media content (e.g., a VR game, a VR video, a VR movie, etc.). In other words, the VR device processor 201, alone or in conjunction with additional processors, may be specifically programmed to detect head movement of the user 101, illustrated in FIG. 1, with respect to various virtual imagery displayed by the VR HMD 102, such as a display device or other input/output ("I/O") devices 204. Further, one or more sensors 203 (e.g., accelerometers, gyroscopes, magnetometers, etc.) may be used to determine the orientation of the VR HMD 102 with respect to virtual imagery displayed by the VR HMD 102.

The VR HMD 102 may also include a memory device 202, which may temporarily store computer readable instructions performed by the VR device processor 201. As an example of such computer readable instructions, a data storage device 205 within the VR device 102 may store VR experience control code 206 and image modification code 207. The VR device processor 201 may execute the VR experience control code 206 to control the VR experience. For example, the VR processor 201 may play a VR short story and adjust image properties of corresponding imagery based upon the viewpoint of the user 101, illustrated in FIG. 1. Accordingly, the VR device processor 201 may execute the image modification code 207 to modify one or more image properties within the VR experience based on the orientation of the VR HMD 102 with respect to an intended focal point within the VR experience. In an alternative embodiment, audio modification code may be used instead of the image modification code 207. For an AR immersive experience device, similar AR componentry may be used in place of the componentry described with respect to FIG. 2.

FIGS. 3A-3J illustrate an example of a VR experience that may be rendered and modified by the VR HMD 102 illustrated in FIG. 2. The VR HMD 102 receives VR media content that includes video content or audiovisual content. The video content or the audiovisual content may include one or more scenes, where each scene is made up of one or more video frames. As used herein, modifications (partial modifications and full modifications) are made with respect to the received VR media content. Views rendered based on the received VR media content will hereafter be referred to as "normal views," while views that have undergone modification with respect to the received VR media content will hereafter be referred to as "modified views."

Figure 3A:
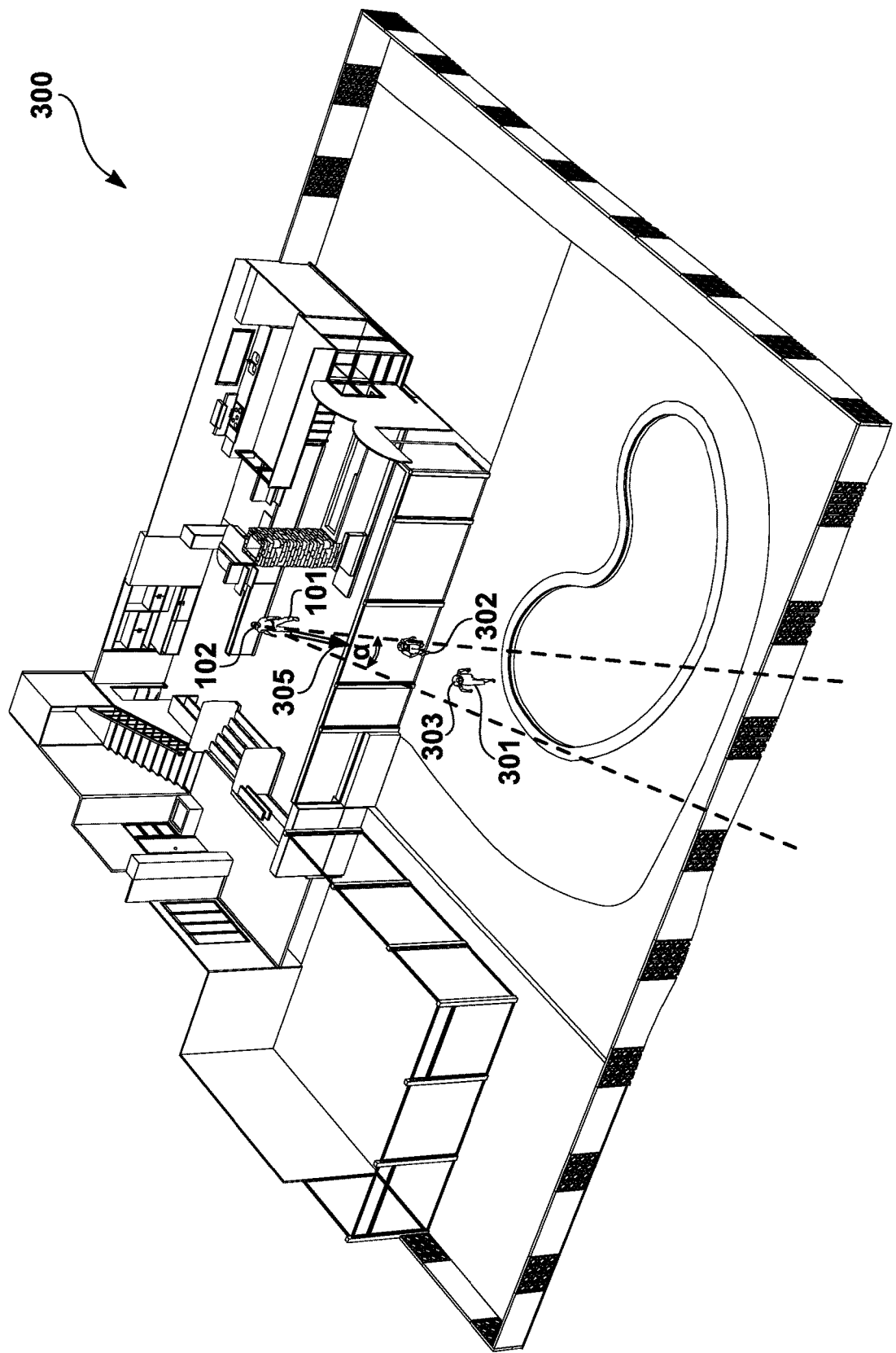
FIG. 3A illustrates a top perspective view of a VR environment that is a virtual house with various virtual people and objects displayed therein by the VR HMD.

FIG. 3A illustrates a top perspective view of a video frame of a VR environment 300 that is a virtual house with various virtual people and objects displayed therein by the VR HMD 102. Although the user 101 would not be viewed by himself or herself within the virtual house, the user 101 is illustrated to depict the orientation of the VR HMD 102 (focal point of the user 101) with respect to virtual elements within the VR environment 300. The user 101 may move about the virtual house while a VR experience is being rendered. In the example of FIGS. 3A-3J, a plot or storyline within the VR media content includes a couple, such as a first virtual character 301 and a second virtual character 302, moving about, and inside and outside of the virtual house.

In one embodiment, each of a plurality of video frames of the VR environment 300 may have a corresponding intended focal point. For example, in the scene illustrated in FIG. 3A, a human operator (e.g., producer, director, etc.) or a computing device may determine that the intended focal point 303 should be the back of the head of the first virtual character 301. Furthermore, the human operator or the computing device may determine an angular displacement threshold (depicted as α in FIG. 3A) with respect to the intended focal point 303. The angular displacement threshold α may be any value less than 360 degrees. For example, the angular displacement threshold α may be 180 degrees or less such as 120 degrees or less, 90 degrees or less, 60 degrees or less, 45 degrees or less, or 30 degrees or less.

For illustration purposes, the figures include an imaginary arrow 305 projecting from the user to the user's current focal point (as determined by the orientation of the VR HMD 102). However, the user 101 will not see the arrow 305 within the VR environment 300. For any given video frame of the VR media content, if the user 101 is positioned or moves such that the orientation of the VR HMD 102 (as depicted by the arrow 305 in FIG. 3A) is within the angular displacement threshold α, no modification is applied to the video frame. Accordingly, the user 101 is given some freedom of movement with respect to the intended focal point 303. As a result, the user 101 is immersed within a VR experience, such as the VR media content, and is able to determine his or her own viewpoint during the VR media content with some degree of flexibility.

In another embodiment, the intended focal point 303 and/or the angular displacement threshold α may be predetermined. Prior to playback of a particular scene, which includes one or more video frames, a human operator or a computing device may determine the intended focal point 303 and/or the angular displacement threshold α without knowing where the user 101 will actually be positioned at that point in the VR experience. In an alternative embodiment, the intended focal point 303 and/or the angular displacement threshold α may be dynamically determined on-the-fly by the VR device processor 201. For example, the VR device processor 201 may determine an optimal intended focal point 303 and/or angular displacement threshold α based on a unique viewing position of the user 101 (e.g., sitting down, bending over, crouching, user height, etc.).

Figure 3B:
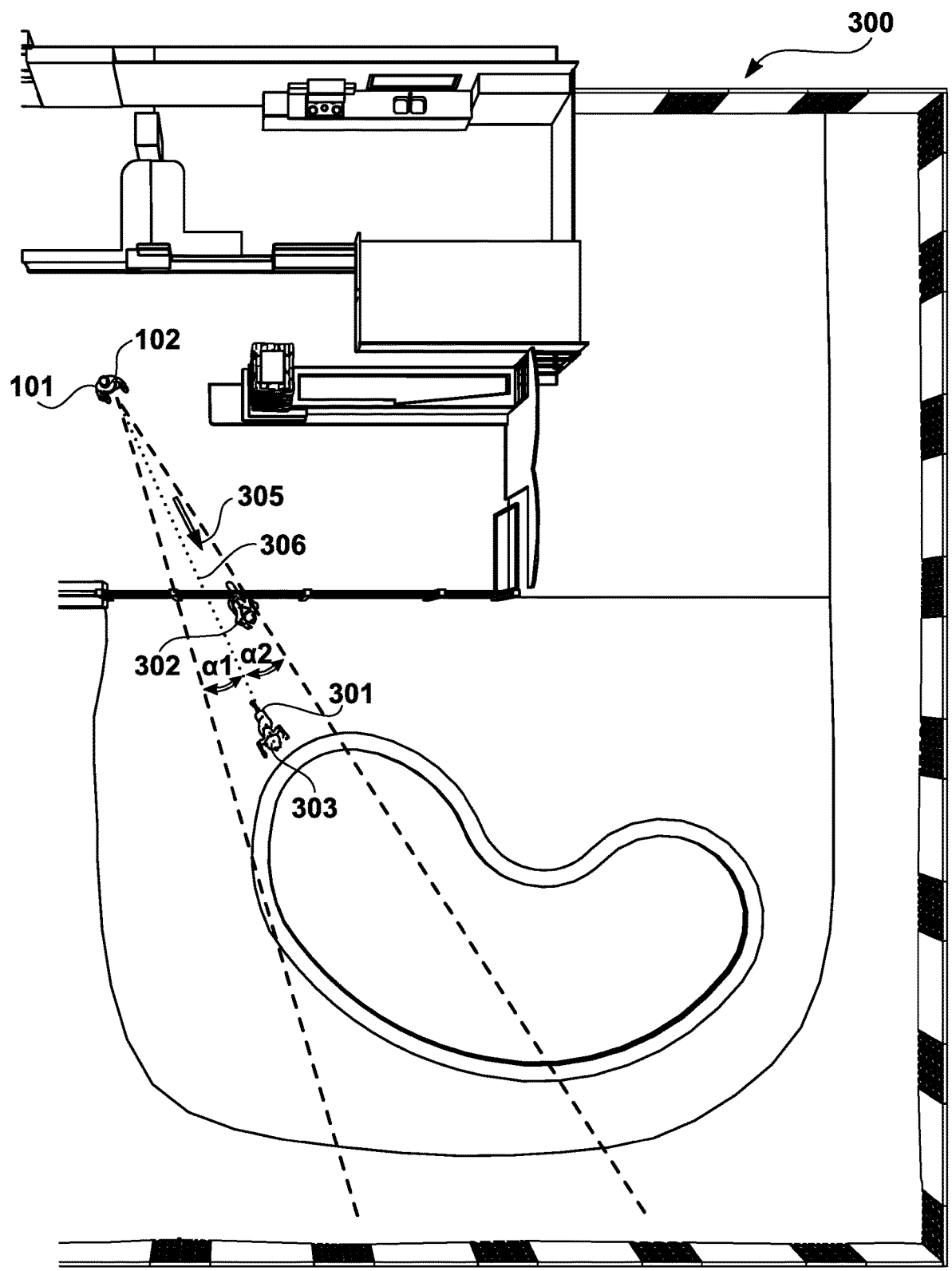
FIG. 3B illustrates a top view of the VR environment illustrated in FIG. 3A.

Further, FIG. 3B illustrates a top view of the VR environment 300 illustrated in FIG. 3A. In one embodiment, the angular displacement threshold α illustrated in FIG. 3A may be determined by projecting an imaginary line 306 from the user 101 (in particular, from the VR HMD 102) toward the intended focal point 303. A first sub-angular displacement α1 to one side of the imaginary line 306 and a second sub-angular displacement α2 to the other side of the imaginary line 306 may, in total, form the angular displacement threshold α. Accordingly, the user 101 is given some freedom of movement to either side (left or right) of the intended focal point 303. In some examples, the first sub-angular displacement α1 and the second sub-angular displacement α2 are of equal magnitude. For example, if the angular displacement threshold α is 120 degrees, an absolute value of the first sub-angular displacement α1 may be 60 degrees and an absolute value of the second sub-angular displacement α2 may be 60 degrees. In other examples, a magnitude of the first sub-angular displacement α1 is greater than a magnitude of the second sub-angular displacement α2. In even further examples, the magnitude of the first sub-angular displacement α1 is less than the magnitude of the second sub-angular displacement α2. Alternatively, either α1 or α2 may equal zero, such that the other value equals α. For example, the user 101 may only be given freedom of movement with respect to one side of the imaginary line 306.

In one embodiment, the VR device processor 201 may adjust the angular displacement threshold α based on the size of the intended focal point 303. For example, the angular displacement threshold α may be narrower when the intended focal point 303 is smaller (e.g., a nose), or may be wider when the intended focal point 303 is larger (e.g., an entire person). A smaller focal point may be a focal point that is less than or equal to a threshold area, while a larger focal point may be a focal point that is greater than the threshold area. In other words, a size of the angular displacement threshold α may be proportional to a size of the intended focal point 303.

Furthermore, the angular displacement threshold α may be based on a relative distance to, or between, various images within the VR environment 300. As an example, a closer proximity of the user 101 to a virtual object may result in a greater angular displacement threshold α than a farther proximity. As another example, the intended focal point 303 may be a position in between the first virtual character 301 and the second virtual character 302. Accordingly, the angular displacement threshold α may be adjusted on a frame-by-frame basis according to the relative distance between the user 101 and virtual characters/objects, or the relative distance between two different virtual characters, objects, or a combination thereof.

Figure 3C:
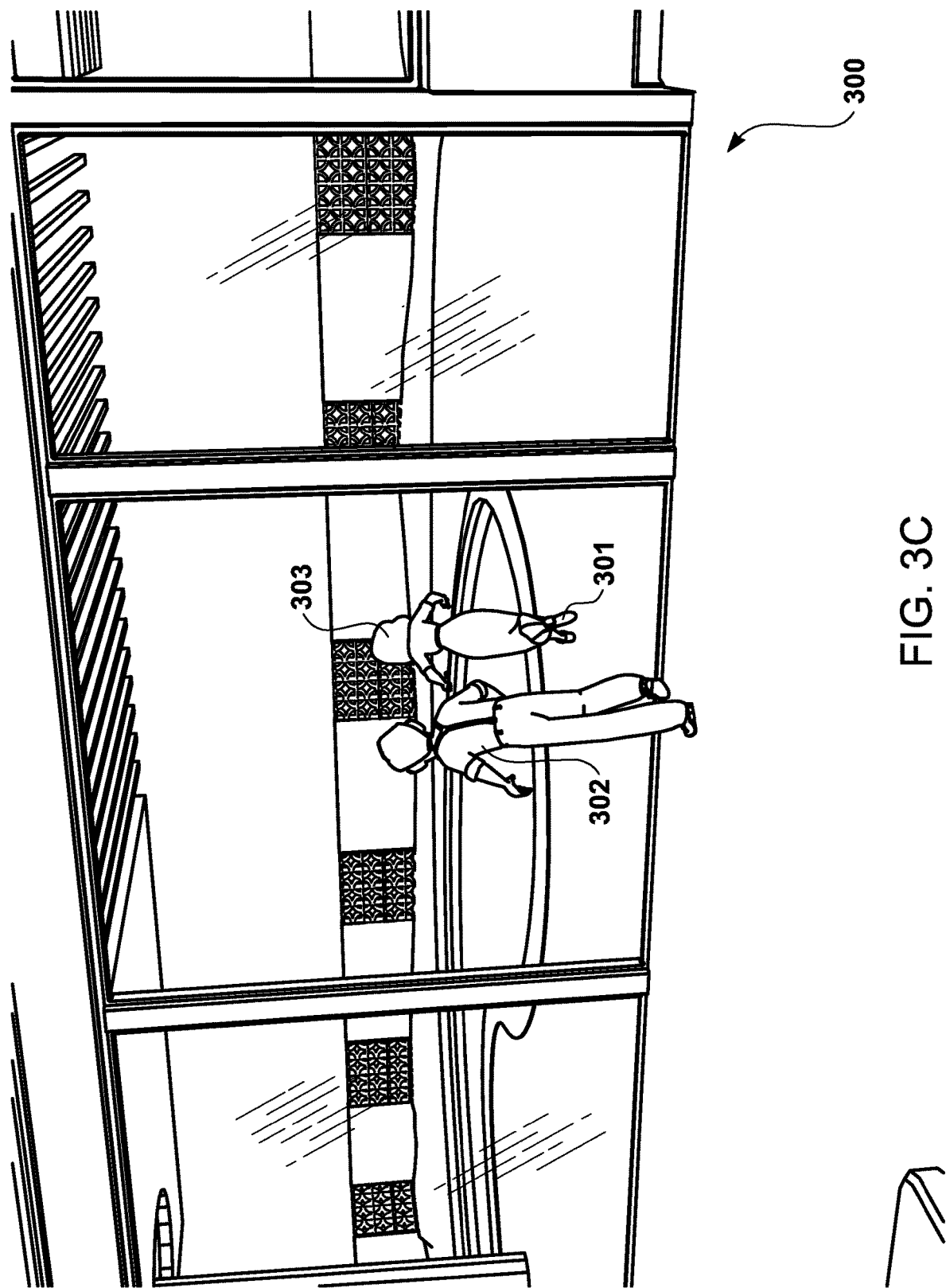
FIG. 3C illustrates an unmodified view of the VR environment, as viewed by the user through the VR HMD.

FIG. 3C illustrates an unmodified view of the VR environment 300, as viewed by the user 101 through the VR HMD 102 in a case where the orientation of the VR HMD 102 is within the angular displacement threshold α illustrated in FIG. 3A. In FIG. 3C, the VR device processor 201 illustrated in FIG. 2 renders a normal view of the VR experience without modifying any image and/or audio properties of the particular video frame with respect to the received VR media content because the user's gaze (orientation of the VR HMD 102) is in enough of the vicinity of the intended focal point 303.

Figure 3D:
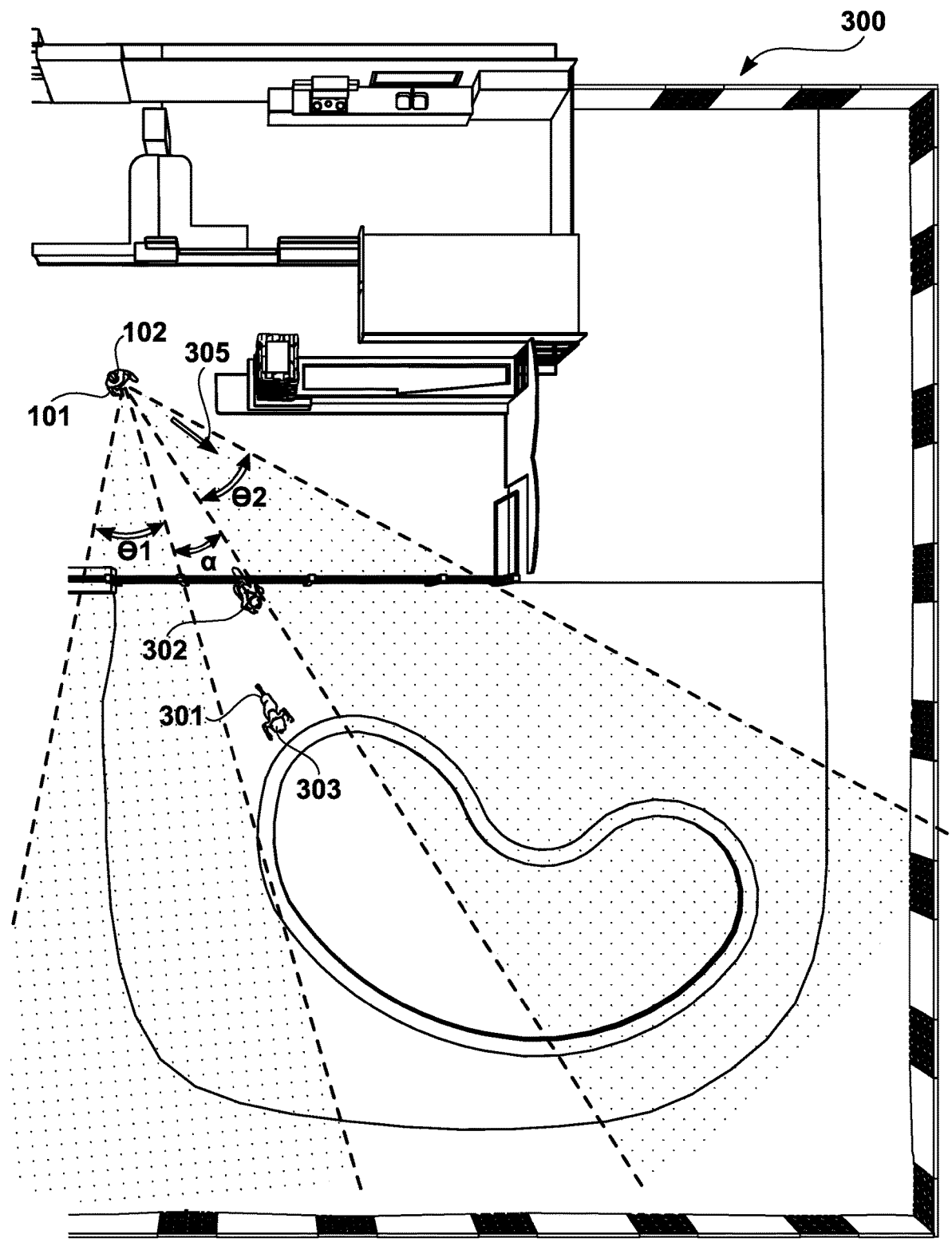
FIG. 3D illustrates a top view of the VR environment illustrated in FIG. 3A in which the gaze of the user exceeds the angular displacement threshold.
Figure 3E:
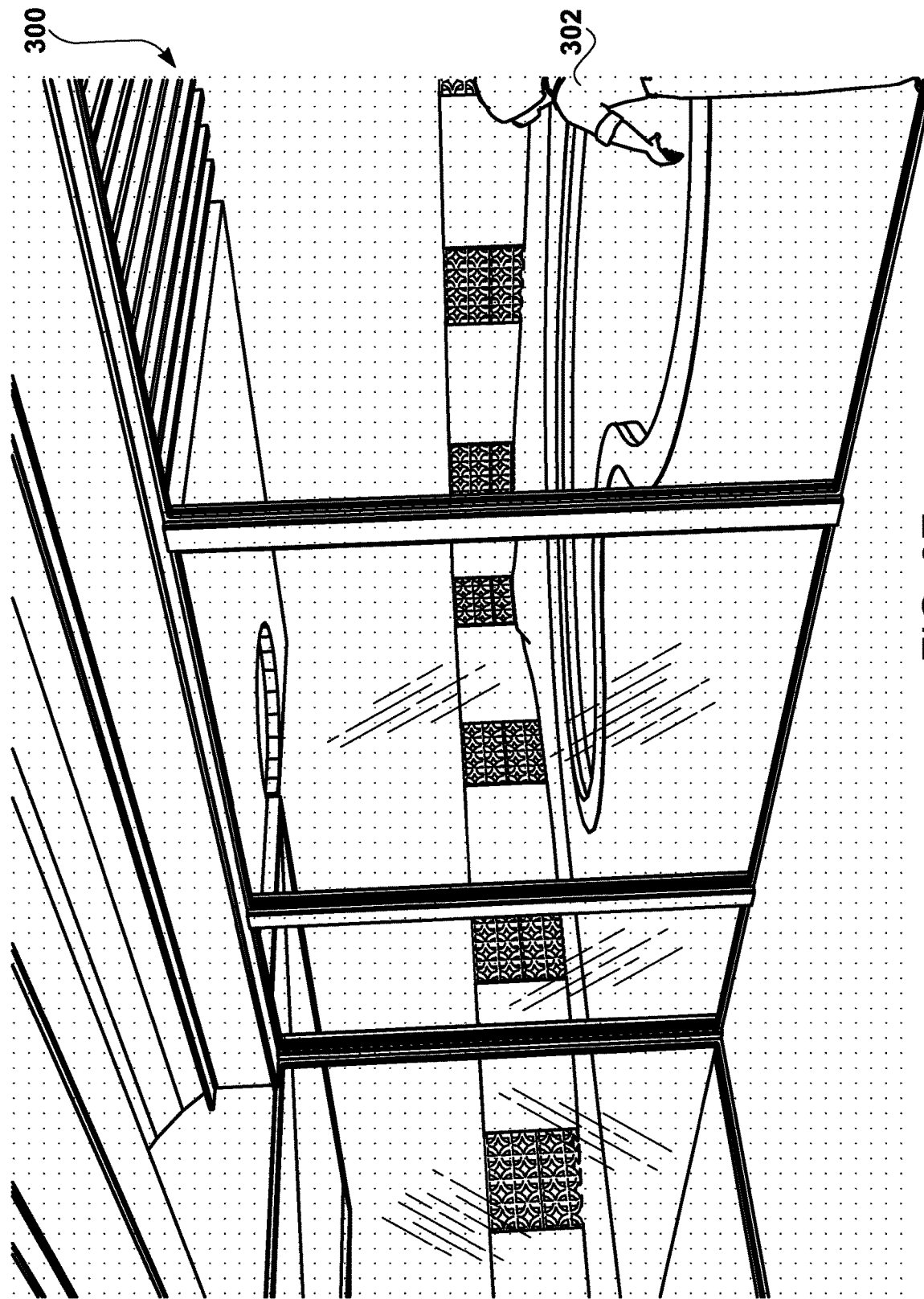
FIG. 3E illustrates the view of the user through the VR HMD of the virtual imagery based upon the viewpoint illustrated in FIG. 3D.

By way of contrast, FIG. 3D illustrates a top view of the VR environment 300 illustrated in FIG. 3A in which the gaze of the user 101 (i.e., the orientation of the VR HMD 102) illustrated by the arrow 305 exceeds the angular displacement threshold α. In one embodiment, the VR device processor 201 determines the extent or degree of the modification applied to the video frame based on the gaze of the user 101 being within a first interpolation angular displacement threshold θ1 or a second interpolation angular displacement threshold θ2. The first and second interpolation angular displacement thresholds θ1 and θ2 may be mirrored to have equal angular displacements, or may have different angular displacements. As illustrated in FIG. 3D, the user's gaze is not within the angular displacement threshold α, but is within the interpolated angular displacement threshold θ2. Accordingly, the VR device processor 201 illustrated in FIG. 2 may apply one or more modifications to the video frame by modifying one or more image and/or audio properties of the video frame with respect to the received VR media content. For instance, FIG. 3E illustrates the view of the user 101 through the VR HMD 102 of the virtual imagery based upon the viewpoint (arrow 305) illustrated in FIG. 3D. To apply a modification to the video frame, the VR device processor 201 may modify one or more image properties such as saturation (tint, tone or shade), luminosity, brightness, value, hue, contrast, resolution, temperature, white balancing, gamma, blur (in focus as opposed to out of focus), etc. Modifying one or more image properties may include modifying each of the pixels included within the interpolated angular displacement threshold θ1 or θ2 for a given video frame. The dotted pattern illustrated in FIG. 3E is illustrated to connote the change of an image property, not any additional imagery inserted into a frame. In other examples, image property modification may include speed modifications involving pause, stop, or delay commands that change the speed of the rendered video playback with respect to the speed of the video playback in the received VR media content.

In some embodiments, the VR device processor 201 may be programmed such that the extent or degree of the modification applied to the video frame may increase linearly as the orientation of the VR HMD 102 (user's gaze) moves further away from the intended focal point 303. In other embodiments, the VR device processor 201 may be programmed to perform a smooth transition to interpolate the extent or degree of the modification applied to the video frame on a scale from no modification (normal view) to a full modification. FIG. 3F illustrates an interpolation graph 330, which depicts a smoothing function that is applied to an image property as an angular displacement from the intended focal point 303 (zero degrees) increases towards the interpolated angular displacement threshold θ1. Any known smoothing function may be used, for example, smoothstep. A similar interpolation graph may be used as the angular displacement from the intended focal point 303 increases towards the interpolated angular displacement threshold θ2.

Figure 3G:
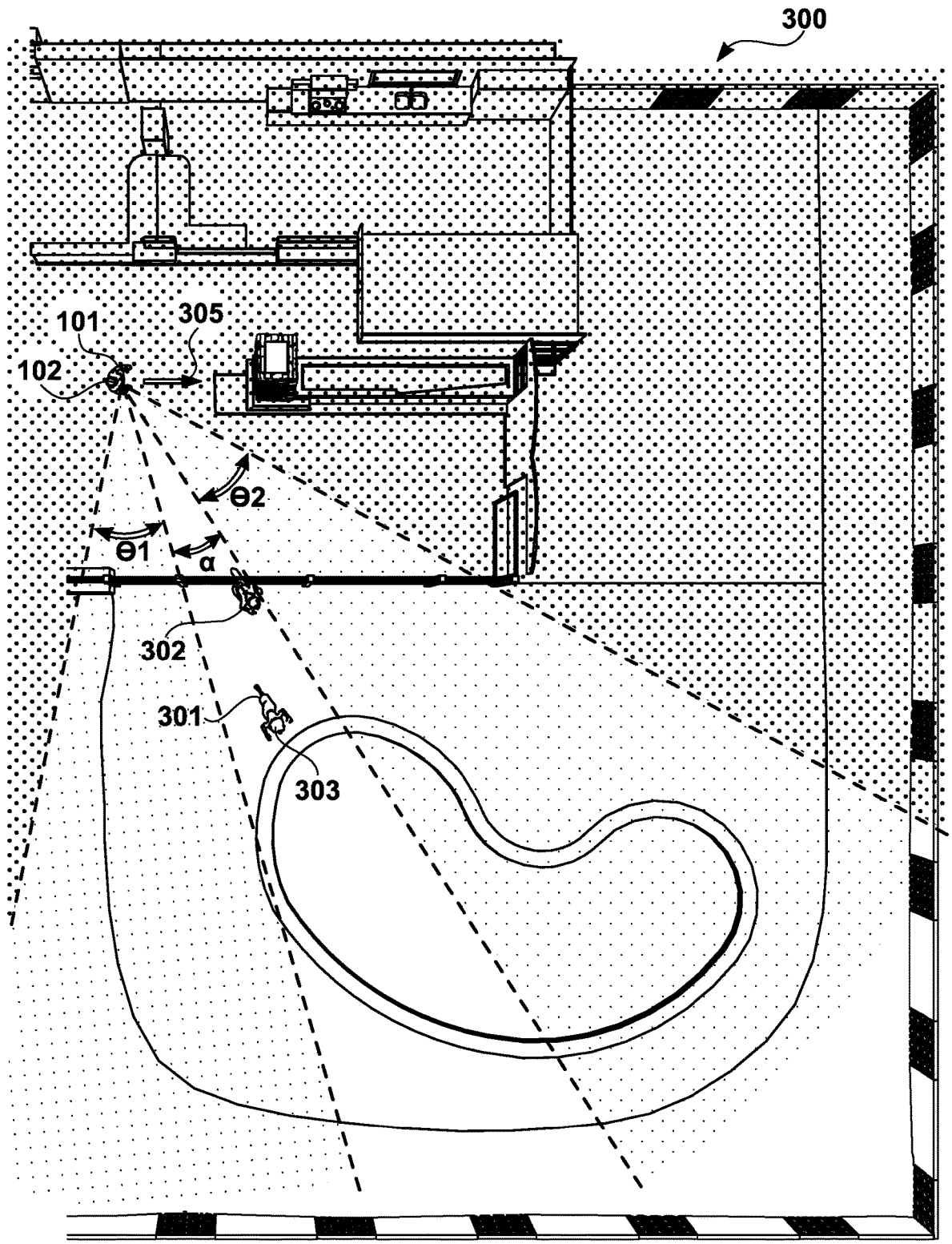
FIG. 3G illustrates a top view of the VR environment illustrated in FIG. 3A in which the gaze of the user exceeds the angular displacement threshold and the interpolated angular displacement threshold.

In order to be least disruptive to the user's VR experience, while still directing the user's attention to the intended focal point 303, the VR device processor 201 may be programmed to increase the extent or degree of the modification applied to the video frame as the orientation of the VR HMD 102 (user's gaze) moves further away from the intended focal point 303. FIG. 3G illustrates a top view of the VR environment 300 illustrated in FIG. 3A in which the gaze of the user 101 (i.e., the orientation of the VR HMD 102) exceeds the angular displacement threshold α and the interpolated angular displacement threshold θ2. As a result, as illustrated in FIG. 3G, the VR device processor 201 may perform a full modification to one or more image and/or audio properties associated with the viewed virtual scenery to prompt the user 101 to turn his or her gaze back toward the intended focal point 303. For example, if the modification is a modification of the image property saturation, a pixel may appear to the user as bright red when the user's gaze is within the angular displacement threshold α (normal view— no modification), the pixel may gradually become a darker red in appearance within the second interpolated angular displacement threshold θ2 as the user's gaze gets further away from the intended focal point 303, and the pixel may appear black when the user's gaze is outside of both the angular displacement threshold α and the interpolated angular displacement threshold θ1 or θ2 (full modification or complete desaturation). In the full modification, the immersive experience may be completely stopped. For example, the people and objects in the VR environment 300 may no longer be visible to the user 101 (e.g., the display may be completely blank or blacked out), or the video and/or audio playback may completely pause.

Although the interpolated modifications are described herein, the VR device processor 201 may perform modifications to image and/or audio properties without any interpolation. For example, the VR device processor 201 may perform a full modification to fully remove the color from VR imagery upon the orientation of the VR HMD 102 exceeding the angular displacement threshold α.

In the embodiments illustrated in FIGS. 3A, 3B, 3D, and 3G, the angular displacement threshold α is illustrated as being narrower than the field of view of the VR HMD 102. However, the angular displacement threshold α may be wider than the field of view of the VR HMD 102, or possibly be of the same width.

Figure 3H:
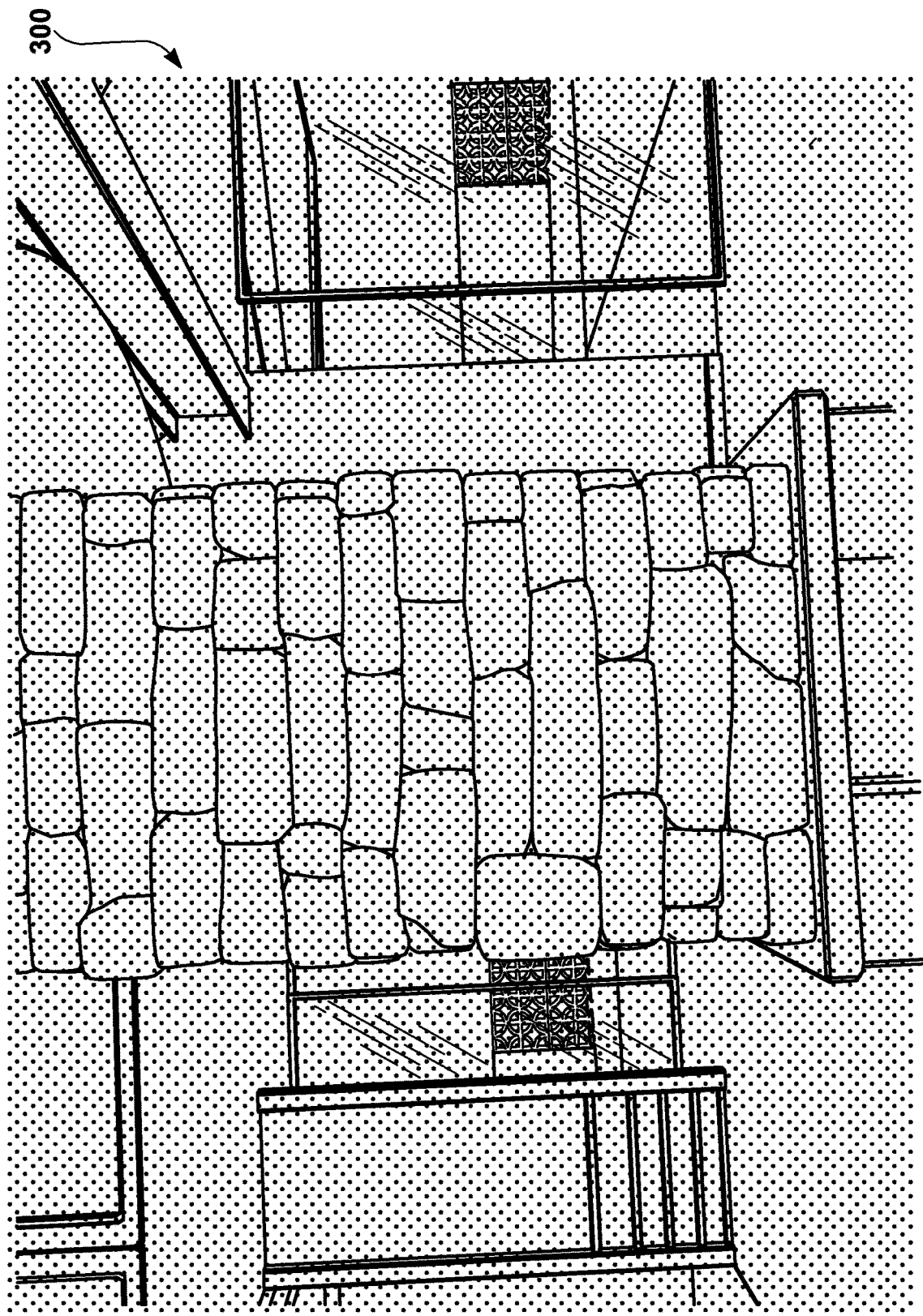
FIG. 3H illustrates the image properties of an entire scene being modified by the VR device processor.

In one embodiment, as illustrated in FIG. 3H, the image properties of an entire scene are fully modified by the VR device processor 201. The denser dotted pattern illustrated in FIGS. 3G and 3H, as opposed to FIGS. 3D and 3E, is illustrated to connote a fully scaled modification to the change of an image property. For example, the denser dotted pattern may connote that the entirety of the depicted frame is blacked out.

Figure 3I:
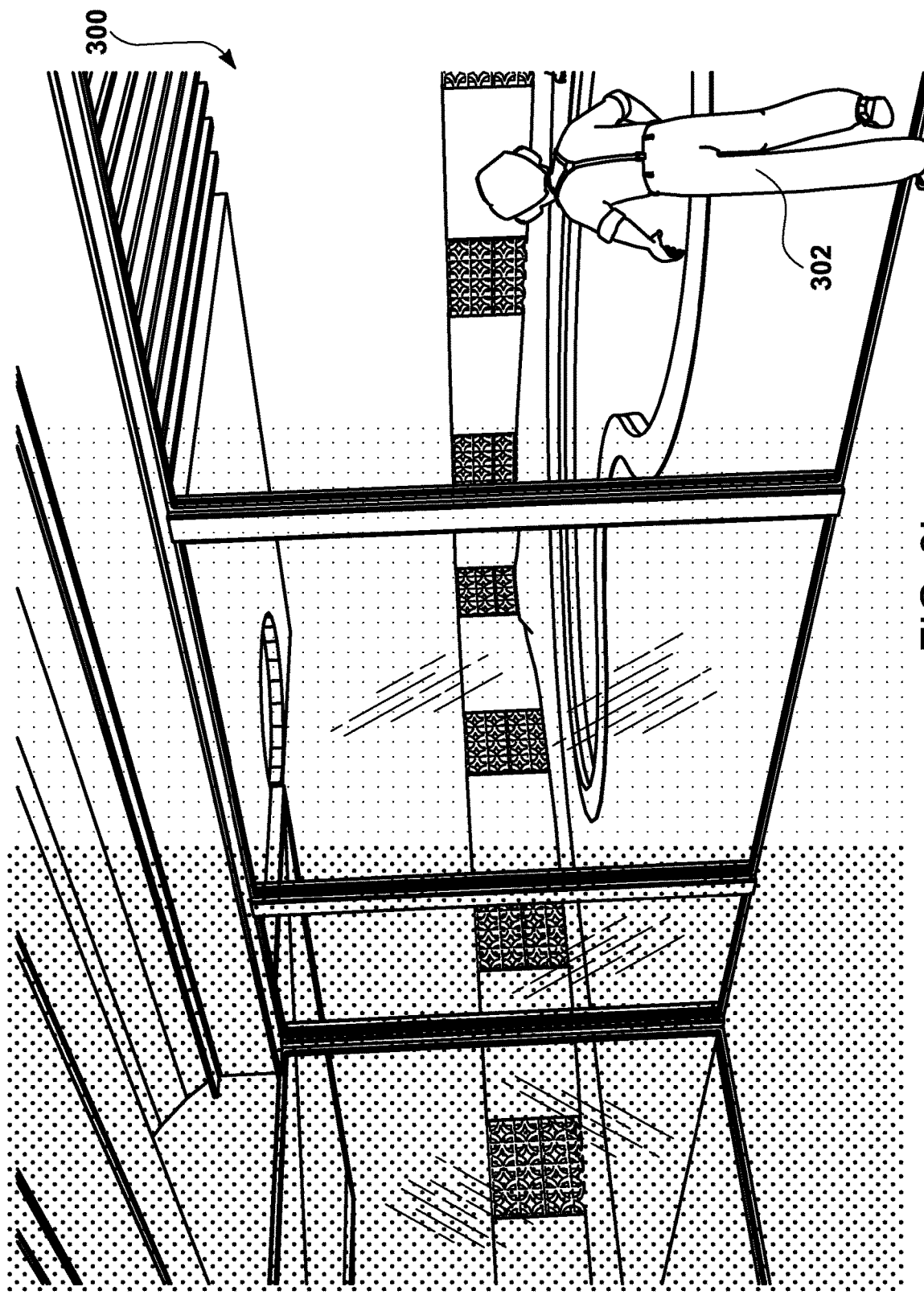
FIG. 3I illustrates the VR environment in which a scene is depicted with increasing image property modification that corresponds to further angular displacements in excess of the angular displacement threshold and/or the interpolated angular displacement threshold.

In an alternative embodiment, the VR device processor 201 may modify portions of the scenery viewed by the user 101 to prompt the user 101. For example, FIG. 3I illustrates the VR environment 300 in which a scene is depicted with increasing image property modification that corresponds to further angular displacements in excess of the angular displacement threshold α and/or the first and second interpolated angular displacement thresholds θ1 and θ2. For instance, a video frame may be partitioned into one or more zones of image property modification. Alternatively, various virtual elements may have differing image property modification such that the virtual elements closer to the intended focal point 303 have less image property modification than those that are farther away.

Although FIGS. 3A-3I are directed to the head rotation of the user 101 from left to right, the VR processor 201 is not limited to detecting compliance along one axis. For example, as illustrated in FIG. 3J, the VR device processor 201 may detect head movement in the up and down directions (e.g., head tilt), and whether such movement is within the angular displacement threshold α and/or the first and second interpolated angular displacement thresholds θ1 and θ2 along that particular axis. For instance, if the VR processor 201 detects that the user 101 is gazing at the floor of the virtual house instead of the back of the head of the first virtual character 301, the VR device processor 201 may modify the image properties of the floor. Accordingly, the VR device processor 201 may analyze orientation and/or translation amongst one or more axes to determine compliance with angular displacement thresholds corresponding to those axes.

Figure 4A:
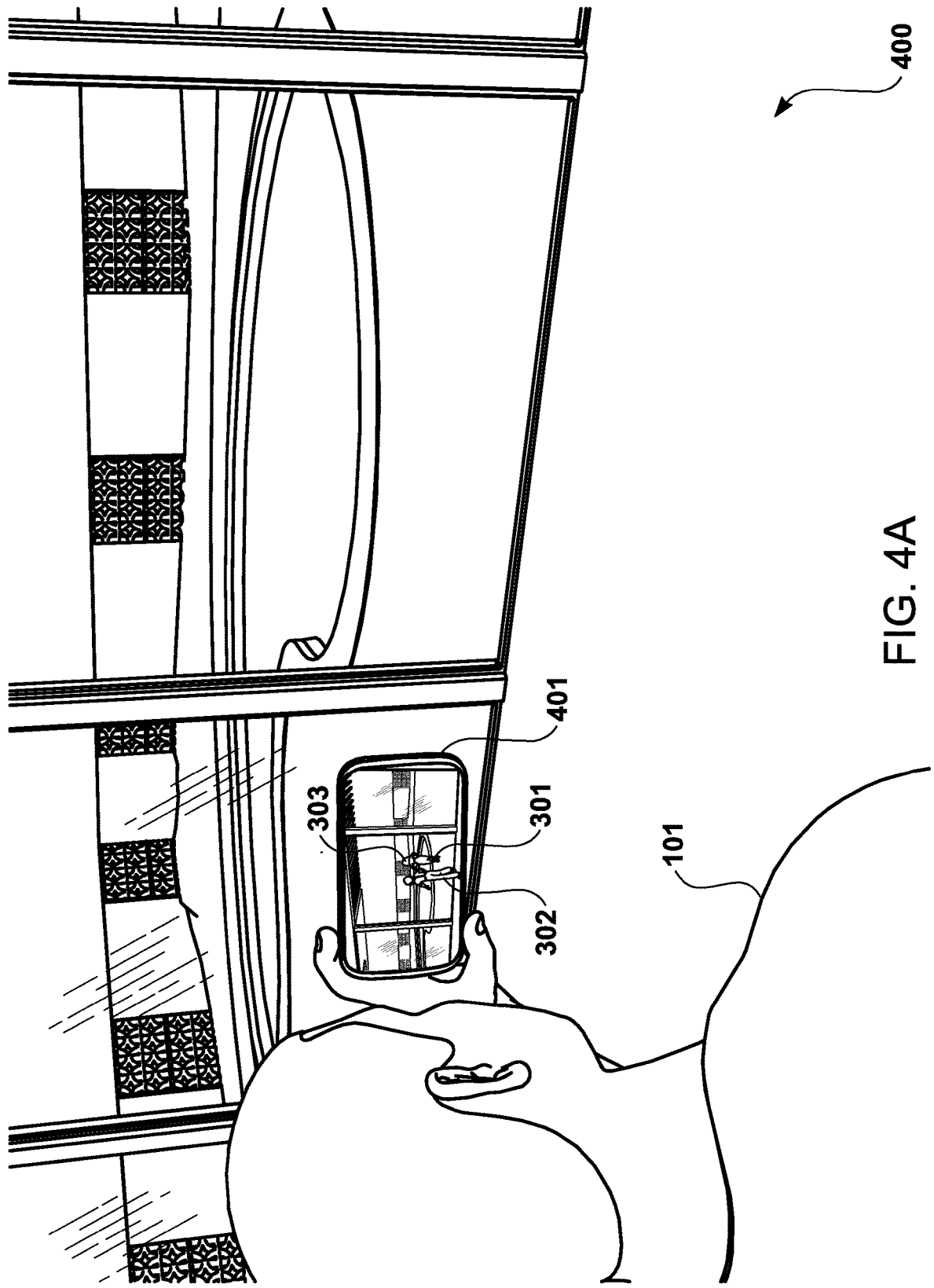
FIG. 4A illustrates the user using the AR device in the AR environment, and gazing at the intended focal point.
Figure 4B:
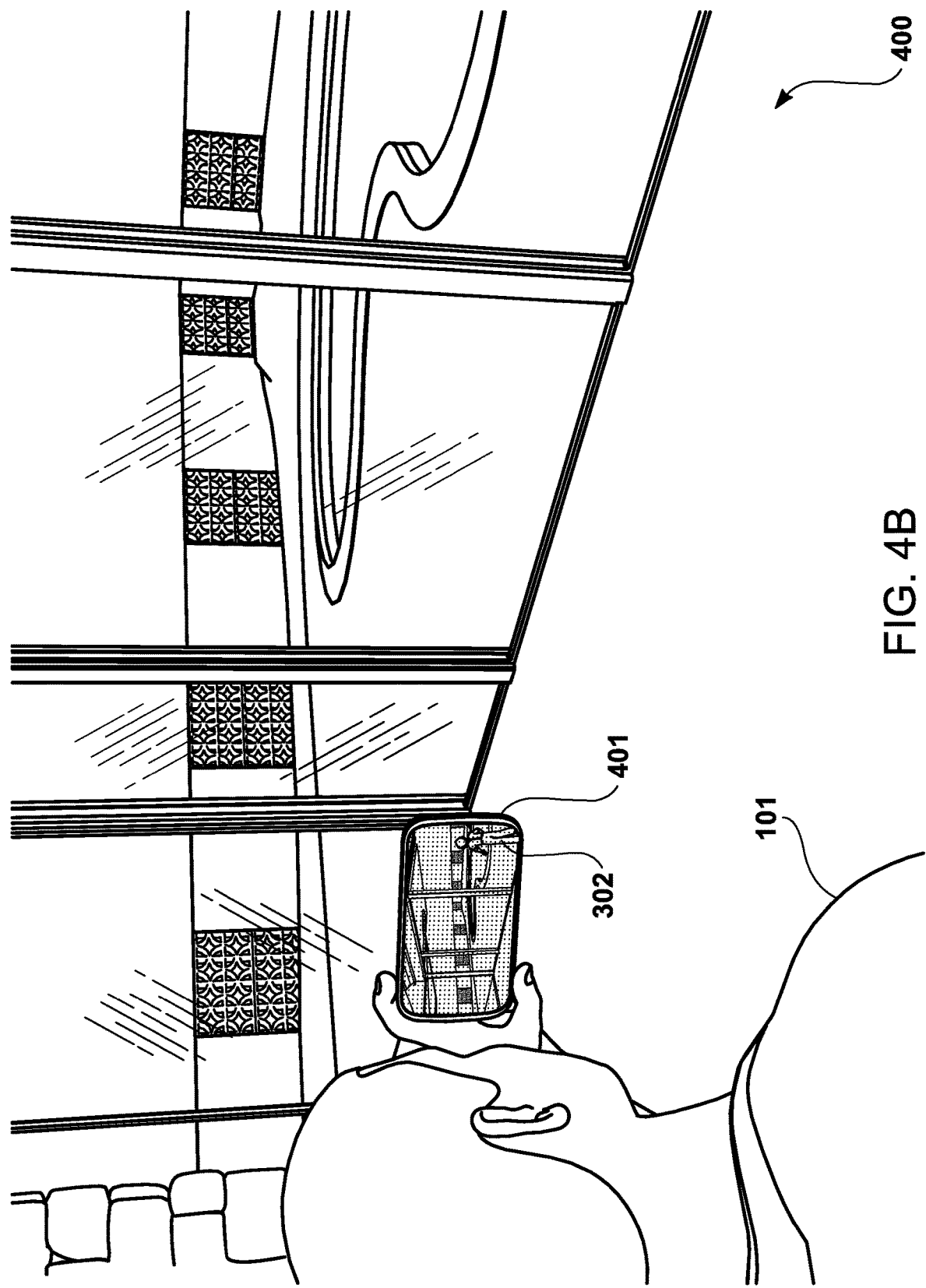
FIG. 4B illustrates the AR device modifying the image properties of the AR experience displayed by the AR device as the user turns away from the intended focal point.

Moreover, FIGS. 4A and 4B illustrate the user 101, illustrated in FIG. 1, using an AR device 401 (e.g., smartphone) to view the virtual characters 301 and 302 in an AR environment 400. A smartphone is only illustrated as an example since a variety of different AR devices, including an HMD, may be used in the AR environment 400. For example, instead of the entire environment being virtual, the house may be a real-world, physical house that is entered by the user 101, who may then use the AR device 401 to view the virtual characters 302 and 303. FIG. 4A illustrates the user 101 using the AR device 401 in the AR environment, and gazing at the intended focal point 303. As the user 101 turns away from the intended focal point 303, the AR device 401 may apply modifications to the video frame by modifying one or more of the image or audio properties of the AR experience with respect to received AR media content. FIG. 4B illustrates an example of a modification of an image property displayed by the AR device 401. The video frame displayed on the AR device 401 may be modified according to any of the techniques described with respect to FIGS. 3A-3J.

Figure 5:
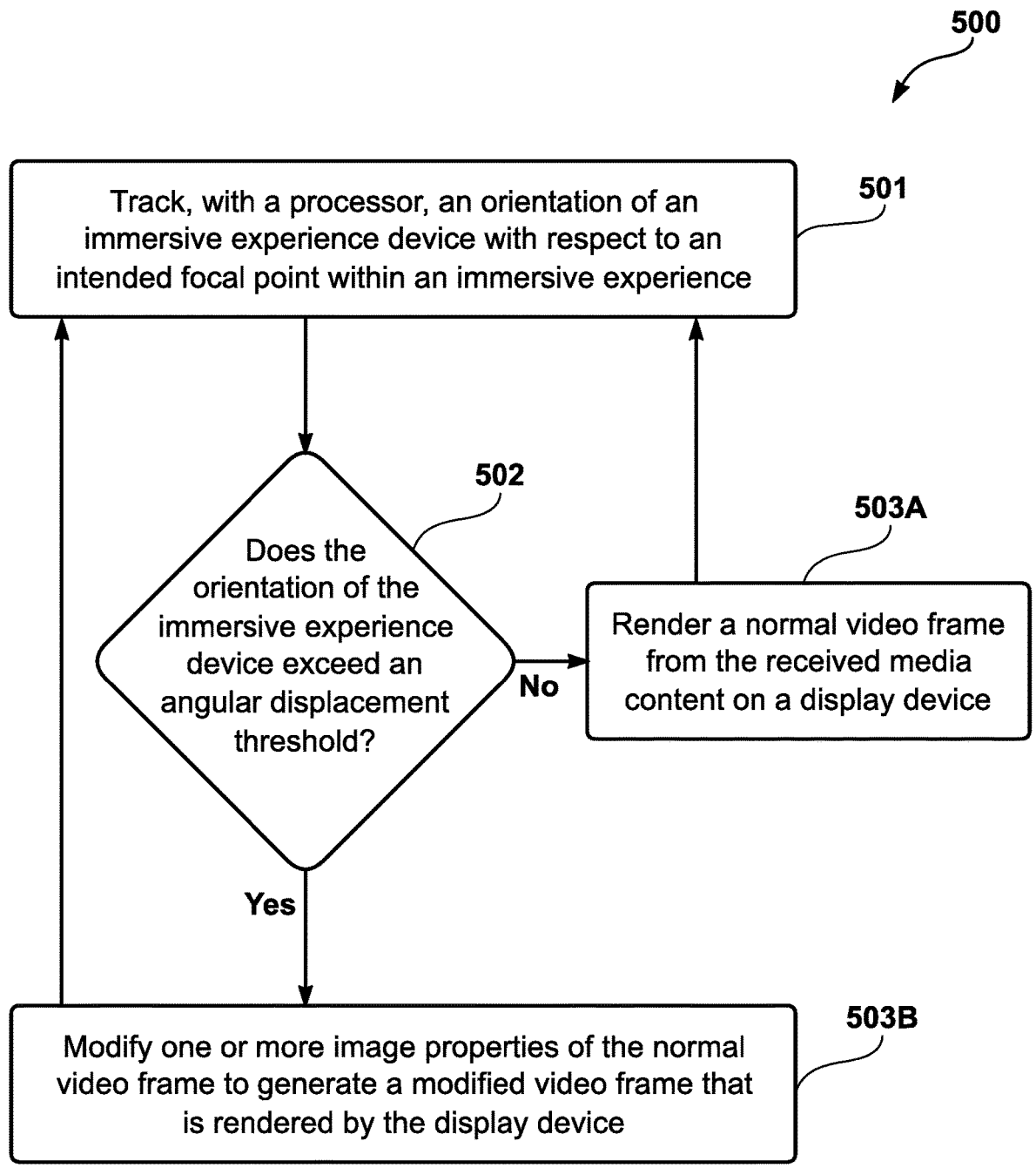
FIG. 5 illustrates a process that may be used by a processor to guide the user, illustrated in FIG. 1, toward the intended focal point, illustrated in FIG. 3A, based on image property modification.

FIG. 5 illustrates a process 500 that may be used by a processor (e.g., the VR device processor 201 illustrated in FIG. 2, an AR device processor, or another specialized processor) to guide the user 101 toward the intended focal point 303, based on image property modification. The process 500 may be repeated for every video frame in the VR or AR media content, or at regular intervals such as every nth video frame (e.g., every other video frame) or at every nth period of time (e.g., every 25 milliseconds). At a process block 501, the process 500 tracks, with a processor, an orientation of an immersive experience device (an oriented focal point) with respect to the intended focal point 303 within the immersive experience. Further, at a process block 502, the process 500 determines, with the processor, whether the orientation of the immersive experience device (oriented focal point) exceeds an angular displacement threshold α, which may be predetermined or dynamically calculated on-the-fly. When the process 500 determines that the orientation of the immersive experience device does not exceed the angular displacement threshold α, the process proceeds to process block 503A in which a normal view (normal video frame) is rendered on a display device. The normal video frame is unmodified with respect to the VR or AR media content received by the processor. After process block 503A, the process 500 is repeated for the next video frame or interval starting at process block 501.

When the process 500 determines that the orientation of the immersive experience device exceeds the angular displacement threshold α, the process 500 continues to a process block 503B. At the process block 503B, the process 500 modifies, with the processor, one or more image properties of the normal video frame to generate a modified video frame that is rendered by the display device. The process 500 may modify a portion of the video frame as in the example of FIG. 3I (e.g., a portion of the video frame in which the oriented focal point is located) or an entirety of the video frame as in the example of FIG. 3E. After process block 503B, the process 500 is repeated for the next video frame or interval starting at process block 501. If the user's gaze is reoriented such that his or her focus is successfully redirected to the intended focal point in the next frame or interval, in the subsequent process block 502, the process 500 will determine that the orientation of the immersive experience device is within the angular displacement threshold α and the process 500 will proceed to the process block 503A. If the user's gaze gets further away from the intended focal point in the next frame or interval, in the subsequent process block 502, the process 500 will determine that the orientation of the immersive experience device exceeds the angular displacement threshold α, and in the subsequent process block 503B, an extent or degree of modification of the one or more image properties may be the same as the previous process block 503B or may change (increase or decrease), depending on the orientation of the immersive experience device. For example, the modification in the previous process block 503B may be a partial modification, while the modification in the subsequent process block 503B may remain a partial modification or become a full modification. In another example, the modification in the previous process block 503B may be a full modification, while the modification in the subsequent process block 503B may become a partial modification. In cases where the modification in the subsequent block 503B remains a partial modification, an extent or degree of the partial modification may increase, decrease, or remain the same, based on whether the orientation of the immersive experience device is further away from the intended focal point, is closer to the intended focal point, or is at the same angular distance from the intended focal point, respectively, as compared to the orientation of the immersive experience device at the prior process block 502.

Figure 6:
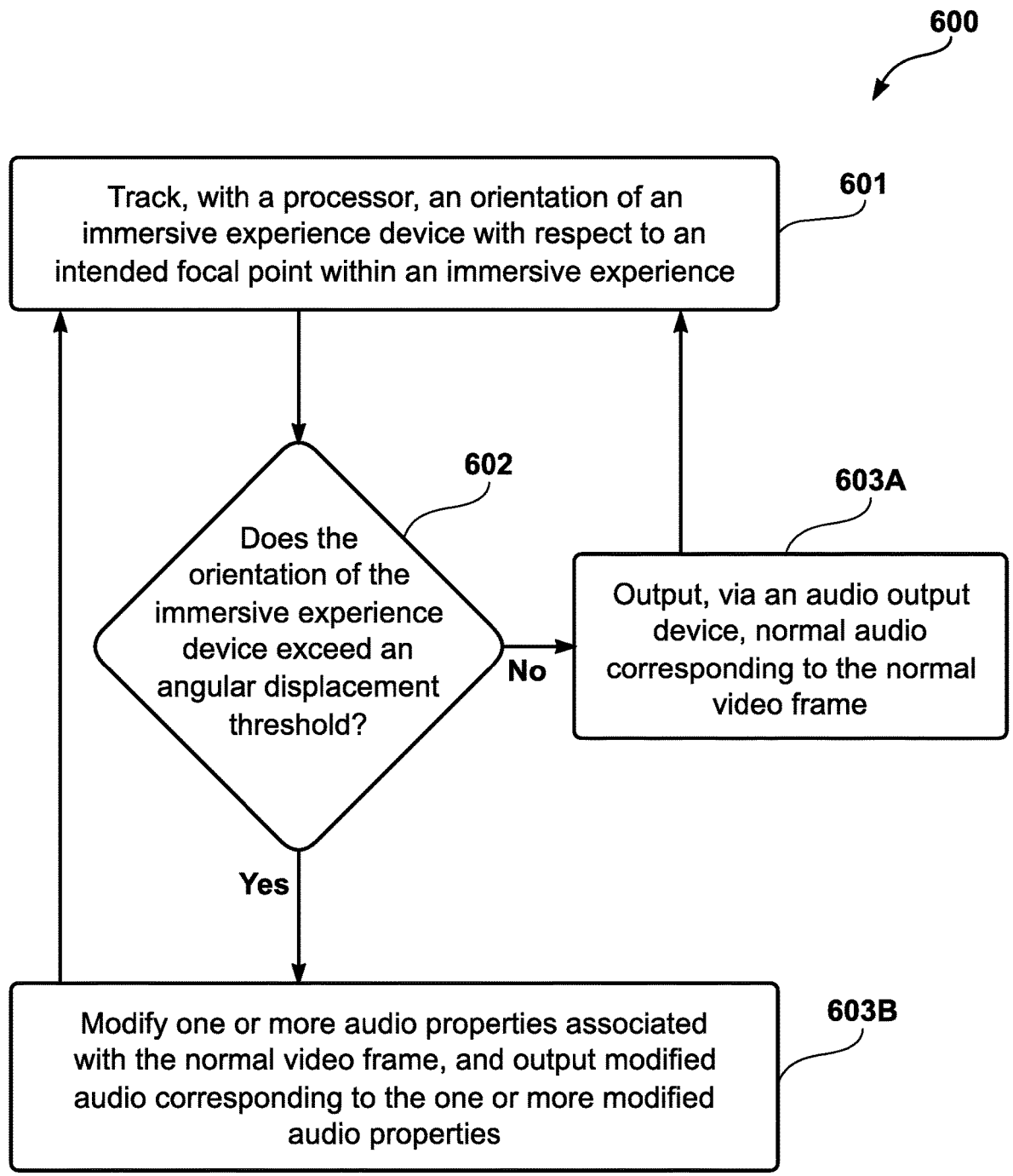
FIG. 6 illustrates a process that may be used by a processor to guide the user 101, illustrated in FIG. 1, toward the intended focal point, illustrated in FIG. 3A, based on audio property modification.

Although various embodiments herein have been described with respect to image property modification, one or more audio properties may alternatively, or additionally, be modified during the immersive experience. FIG. 6 illustrates a process 600 that may be used by a processor (e.g., the VR device processor 201 illustrated in FIG. 2, an AR device processor, or another specialized processor) to guide the user 101 toward the intended focal point 303, based on audio property modification (e.g., volume level (decibel values), audio effects, speed of audio emission, etc.). For example, as the user 101 turns away from the intended focal point 303 of the back of the head of the first virtual character 301 outside of the angular displacement threshold α, the voice of the first virtual character 301 may be altered (blurred, slowed, echoed, reduced in volume, etc.) until the user 101 resumes focus at the intended focal point 303. The process 600 may be repeated for every video frame in the VR or AR media content, or at regular intervals such as every nth video frame (e.g., every other video frame) or at every nth period of time (e.g., every 25 milliseconds). As described in the examples of image property modification, a degree or extent of modification of the one or more audio properties may vary based on an angular displacement between the orientation of the immersive experience device and the intended focal point.

At a process block 601, the process 600 tracks, with a processor, an orientation of the immersive experience device (an oriented focal point) with respect to an intended focal point 303 within the immersive experience. Additionally, at a process block 602, the process 600 determines, with the processor, whether the orientation of the immersive experience device (oriented focal point) exceeds an angular displacement threshold α, which may be predetermined or dynamically calculated on-the-fly. When the process 600 determines that the orientation of the immersive experience device does not exceed the angular displacement threshold α, the process 600 proceeds to process block 603A in which normal audio is outputted via an audio output device. The normal audio is unmodified with respect to the VR or AR media content received by the processor. After process block 603A, the process 600 is repeated for the next video frame or interval starting at process block 601.

When the process 600 determines that the orientation of the immersive experience device exceeds the angular displacement threshold α, the process 600 continues to a process block 603B. At the process block 603B, the process 600 modifies, with the processor, one or more audio properties associated with the normal video frame, and outputs modified audio corresponding to the one or more modified audio properties. The process 600 may modify a portion of the audio corresponding to the video frame (e.g., a sound associated with the intended focal point 303) or an entirety of the audio corresponding to a video frame (e.g., all of the sounds associated with the video frame such as a character's voice, background music, etc.). After process block 603B, the process 600 is repeated for the next video frame or interval starting at process block 601. If the user's gaze is reoriented such that his or her focus is successfully redirected to the intended focal point in the next frame or interval, in the subsequent process block 602, the process 600 will determine that the orientation of the immersive experience device is within the angular displacement threshold α and the process 600 will proceed to the process block 603A. If the user's gaze gets further away from the intended focal point in the next frame or interval, in the subsequent process block 602, the process 600 will determine that the orientation of the immersive experience device exceeds the angular displacement threshold α, and in the subsequent process block 603B, an extent or degree of modification of the one or more audio properties may be the same as the previous process block 603B or may change (increase or decrease), depending on the orientation of the immersive experience device. For example, the modification in the previous process block 603B may be a partial modification, while the modification in the subsequent process block 603B may remain a partial modification or become a full modification. In another example, the modification in the previous process block 503B may be a full modification, while the modification in the subsequent process block 503B may become a partial modification. In cases where the modification in the subsequent block 603B remains a partial modification, an extent or degree of the partial modification may increase, decrease, or remain the same, based on whether the orientation of the immersive experience device is further away from the intended focal point, is closer to the intended focal point, or is at the same angular distance from the intended focal point 303, respectively, as compared to the orientation of the immersive experience device at the prior process block 602.

Although FIG. 5 describes a process in which only one or more image properties are modified (e.g., saturation only, saturation and hue, etc.), and FIG. 6 describes a process in which only one or more audio properties are modified (e.g., speed only, speed and volume, etc.), in other embodiments, it is possible to modify one or more image properties and one or more audio properties.

The imagery displayed in the VR media content herein is not limited to predetermined imagery. For example, images may be dynamically introduced in a multi-player game when a new player initiates participation in the game. As a result, a corresponding avatar for that player may be virtually displayed within the immersive experience. The intended focal point 303, as illustrated in FIG. 3, may then be dynamically determined based on tracking of an additional immersive experience device, which is worn by the new player, within the immersive experience.

The processes described herein may be implemented in a specialized processor. Such a processor will execute instructions, either at the assembly, compiled or machine-level, to perform the processes. Those instructions may be stored on a computer readable medium (e.g., computer readable storage device) capable of carrying those instructions.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable storage device having a computer readable program stored thereon, wherein the computer readable program when executed on a computer causes the computer to:
   receive media content including one or more normal video frames;
   track, with a processor, an orientation of an immersive experience device with respect to an intended focal point within an immersive experience;
   determine, with the processor, whether the orientation of the immersive experience device exceeds an angular displacement threshold;
   in response to a determination that the orientation of the immersive experience device does not exceed the angular displacement threshold, render a normal video frame from the received media content on a display device; and
   in response to a determination that the orientation of the immersive experience device exceeds the angular displacement threshold, modify one or more properties of the normal video frame to generate a modified video frame, and render the modified video frame on the display device.

2. The computer program product of claim 1, wherein the one or more properties that are modified comprise one or more image properties.

3. The computer program product of claim 2, wherein the one or more image properties that are modified comprise one or more of hue, saturation, luminosity, brightness, value, contrast, resolution, temperature, white balancing, gamma, blur, or a speed at which a video experience is rendered.

4. The computer program product of claim 1, wherein the one or more properties that are modified comprise one or more audio properties.

5. The computer program product of claim 4, wherein the one or more audio properties comprise at least one of a decibel value or a speed at which an audio experience is rendered.

6. The computer program product of claim 1, wherein the computer is further caused to:
   determine, with the processor, a reorientation of the immersive experience device that is within the angular displacement threshold; and
   render, with the processor, the normal video frame from the received media content as a reoriented viewing experience on the display device.

7. The computer program product of claim 1, wherein at least one of the angular displacement threshold or the intended focal point is predetermined.

8. The computer program product of claim 1, wherein the computer is further caused to:
   determine, with the processor, whether the orientation of the immersive experience device is within an interpolation angular displacement threshold outside of the angular displacement threshold;
   in response to a determination that the orientation of the immersive experience device is within the interpolation angular displacement threshold, perform an interpolated modification to the one or more properties of the normal video frame to generate a partially modified video frame, and render the partially modified video frame as the modified video frame on the display device; and
   in response to a determination that the orientation of the immersive experience device exceeds the angular displacement threshold and the interpolation angular displacement threshold, perform a full modification to the one or more properties of the normal video frame to generate a fully modified video frame, and render the fully modified video frame as the modified video frame on the display device,
   wherein the one or more properties are modified to a greater degree in the fully modified video frame as compared to the partially modified video frame.

9. A method comprising:
   receiving media content including one or more normal video frames;
   tracking, with a processor, an orientation of an immersive experience device with respect to an intended focal point within an immersive experience;
   determining, with the processor, whether the orientation of the immersive experience device exceeds an angular displacement threshold;

in response to a determination that the orientation of the immersive experience device does not exceed the angular displacement threshold, rendering a normal video frame from the received media content on a display device; and in response to a determination that the orientation of the immersive experience device exceeds the angular displacement threshold, modifying one or more properties of the normal video frame to generate a modified video frame, and rendering the modified video frame on the display device, the one or more properties comprising an image property, an audio property, or a combination thereof.

10. The method of claim 9, further comprising:

determining, with the processor, a reorientation of the immersive experience device that is within the angular displacement threshold; and rendering, with the processor, the normal video frame from the received media content as a reoriented viewing experience on the display device.

11. The method of claim 9, wherein the one or more properties includes at least one image property comprising hue, saturation, luminosity, brightness, value, contrast, resolution, temperature, white balancing, gamma, blur, or a speed at which a video experience is rendered.

12. The method of claim 9, wherein at least one of the angular displacement threshold or the intended focal point is predetermined.

13. The method of claim 9, further comprising:

determining, with the processor, whether the orientation of the immersive experience device is within an interpolation angular displacement threshold outside of the angular displacement threshold;

in response to a determination that the orientation of the immersive experience device is within the interpolation angular displacement threshold, performing an interpolated modification to the one or more properties of the normal video frame to generate a partially modified video frame, and rendering the partially modified video frame as the modified video frame on the display device; and in response to a determination that the orientation of the immersive experience device exceeds the angular displacement threshold and the interpolation angular displacement threshold, performing a full modification to the one or more properties of the normal video frame to generate a fully modified video frame, and rendering the fully modified video frame as the modified video frame on the display device, wherein the one or more properties are modified to a greater degree in the fully modified video frame as compared to the partially modified video frame.

14. The computer program product of claim 9, wherein the one or more properties includes at least one audio property comprising at least one of a decibel value or a speed at which an audio experience is rendered.

15. An immersive experience system comprising:

a display device; and a processor that receives media content including one or more normal video frames, tracks an orientation of the display device with respect to an intended focal point within an immersive experience, determines whether the orientation of the display device exceeds an angular displacement threshold, renders a normal video frame from the received media content on a display device in response to a determination that the orientation of the immersive experience device does not exceed the angular displacement threshold, and modifies one or more properties of the normal video frame to generate a modified video frame, and renders the modified video frame on the display device in response to a determination that the orientation of the immersive experience device exceeds the angular displacement threshold.

16. The immersive experience system of claim 15, wherein the one or more properties that are modified comprise one or more image properties.

17. The immersive experience system of claim 15, wherein the one or more properties that are modified comprise one or more audio properties.

18. The immersive experience system of claim 15, wherein the processor further determines a reorientation of the display device that is within the angular displacement threshold, and the normal video frame as a reoriented viewing experience on the display device.

19. The immersive experience system of claim 15, wherein the one or more image properties that are modified comprise hue, saturation, luminosity, brightness, value, contrast, resolution, temperature, white balancing, gamma, blur, or a speed at which a video experience is rendered.

20. The immersive experience system of claim 15, wherein at least one of the angular displacement threshold or the intended focal point is predetermined.

* * * * *